(12) United States Patent  
Varan

(10) Patent No.: US 6,929,276 B2  
(45) Date of Patent: Aug. 16, 2005

(54) MECHANISM FOR DRIVING BICYCLES

(76) Inventor: Cyrus Varan, 236 Vipond Rd., Whangaparaoa, Hibiscus Coast (NZ)

(*) Notice: Subject to any disclaimer, the term of this patent is extended or adjusted under 35 U.S.C. 154(b) by 0 days.

(21) Appl. No.: 10/966,230

(22) Filed: Oct. 15, 2004

(65) Prior Publication Data

US 2005/0046140 A1 Mar. 3, 2005

Related U.S. Application Data

(63) Continuation of application No. 09/986,832, filed on Nov. 13, 2001, now Pat. No. 6,817,621.
(60) Provisional application No. 60/253,093, filed on Nov. 28, 2000.

(51) Int. Cl.[7] ............................................. B62M 1/02
(52) U.S. Cl. ..................... 280/261; 280/288.1; 280/237; 474/88
(58) Field of Search ........................... 280/29, 200, 210, 280/236, 237, 252, 259–261, 288, 281.1 288.1; 474/88, 89, 148

(56) References Cited

U.S. PATENT DOCUMENTS 3,680,879 A * 8/1972 Cogliano .................... 280/278

| 5,211,415 | A |  | 5/1993 | Gasiorowski |
| 5,254,042 | A |  | 10/1993 | Chung-Suk |
| 5,257,562 | A |  | 11/1993 | Nagano |
| 5,435,583 | A |  | 7/1995 | Foster, Jr. |
| 5,551,718 | A |  | 9/1996 | Toronto et al. |
| 5,662,346 | A |  | 9/1997 | Toronto et al. |
| 5,662,347 | A |  | 9/1997 | Toronto et al. |
| 5,765,847 | A |  | 6/1998 | Toronto et al. |
| 5,911,792 | A |  | 6/1999 | Jaimes |
| 5,918,894 | A |  | 7/1999 | Toronto et al. |
| 6,079,775 | A |  | 6/2000 | Lawson |
| 6,817,621 | B2 | * | 11/2004 | Varan ...................... 280/281.1 |

* cited by examiner

*Primary Examiner*—Matthew Luby  
(74) *Attorney, Agent, or Firm*—Jaeckle Fleischmann & Mugel, LLP

(57) ABSTRACT

Improved mechanical structure for increased efficiency in the transfer of the peddling force applied to a pedal crank assembly to the rear wheel of a bicycle is disclosed. This structure increases efficiency by decreasing the loss of exerted energy when peddling at dead spots, which dead spots are the common terminology used to refer to when the legs are either at down-stroke and up-stroke positions.

15 Claims, 8 Drawing Sheets

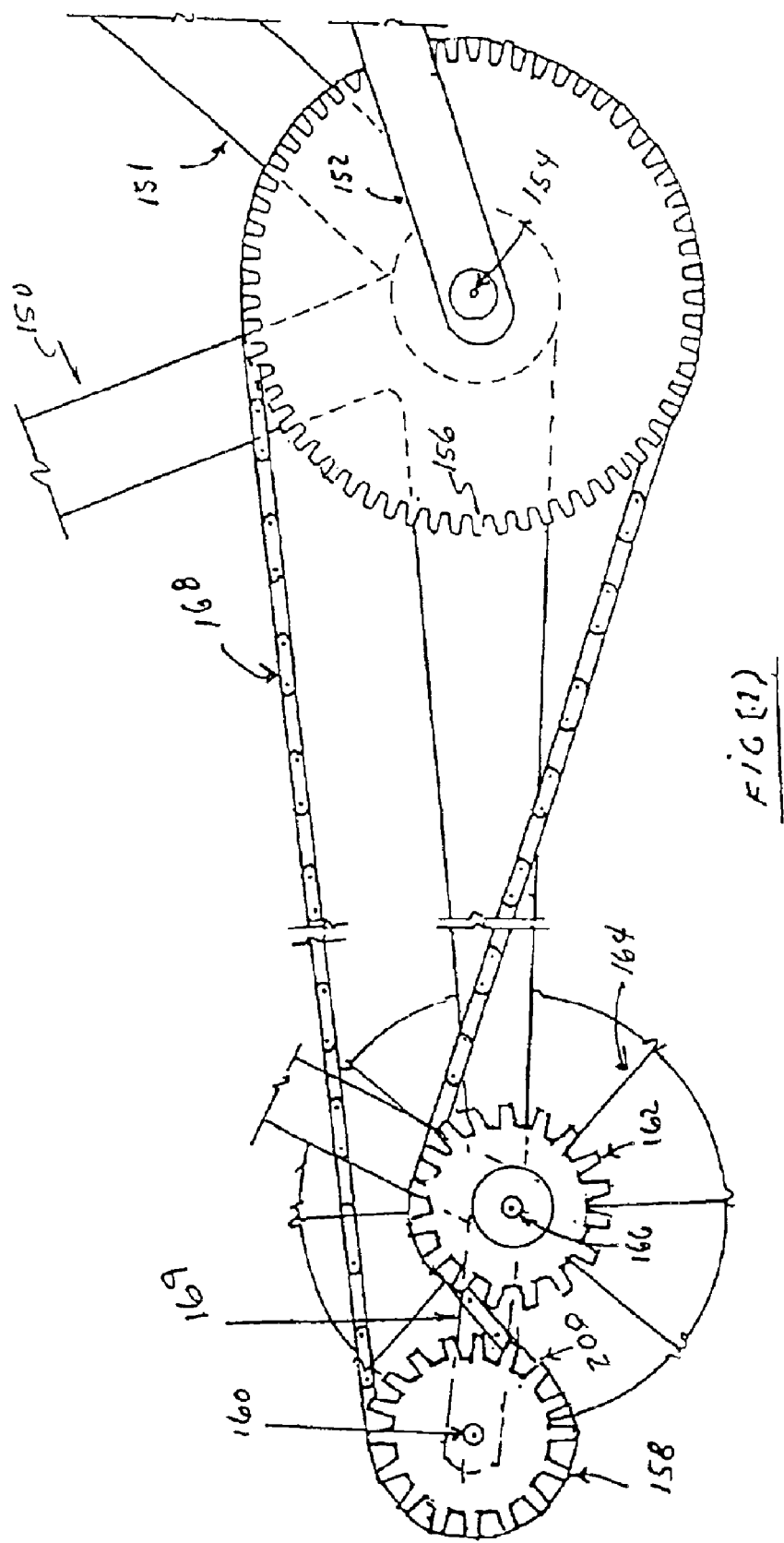

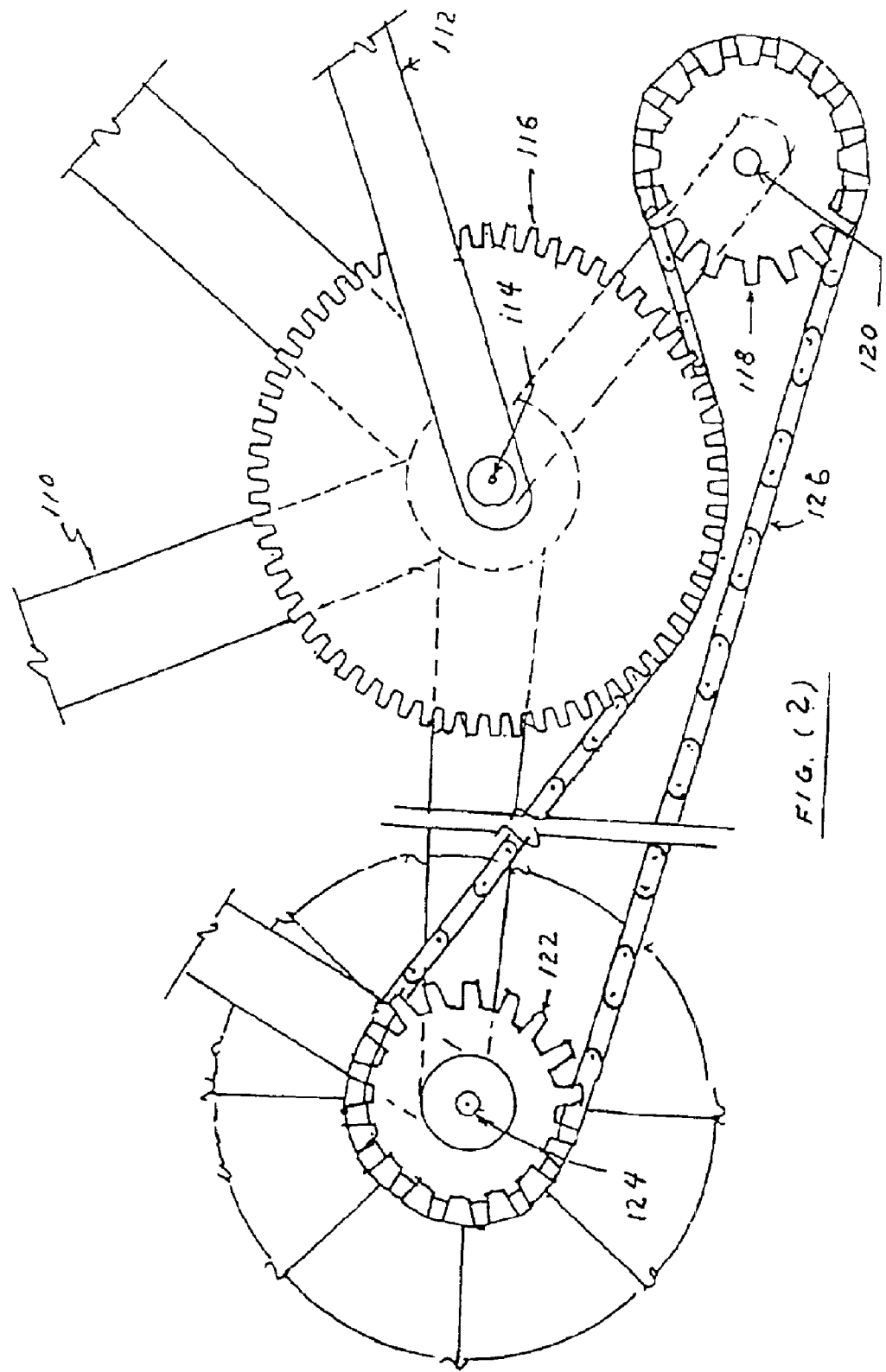

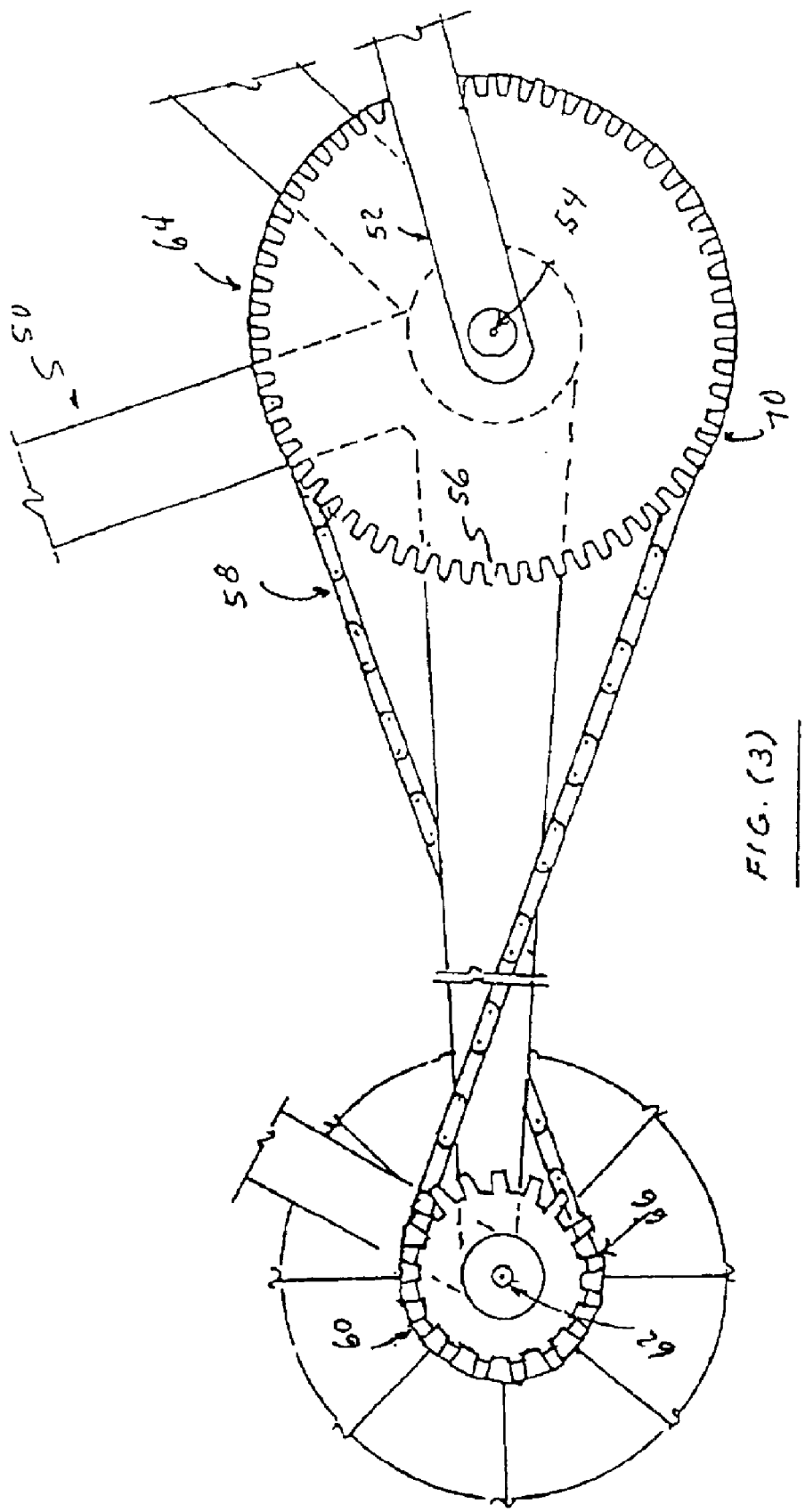
FIG. (3)

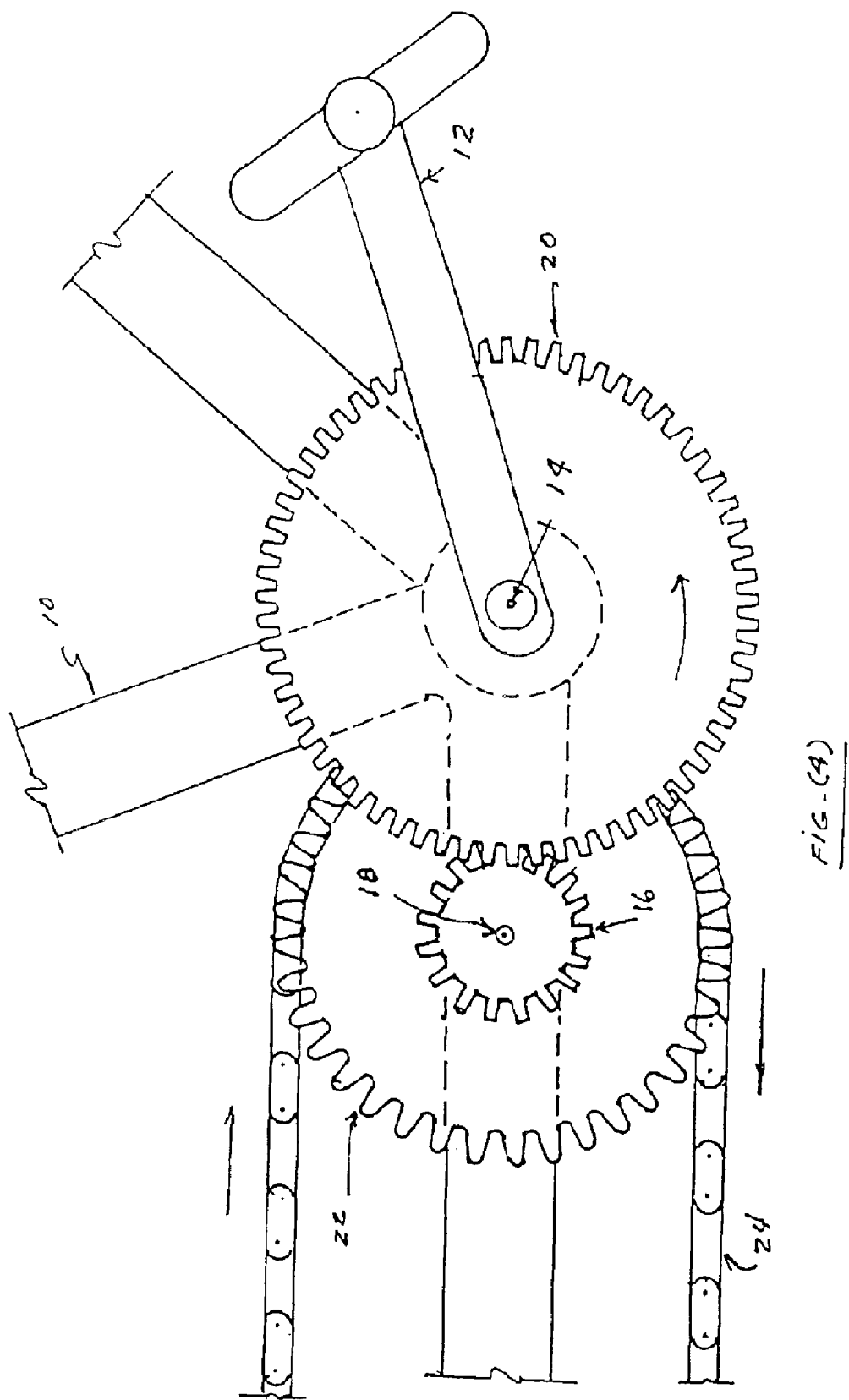
FIG.-(4)

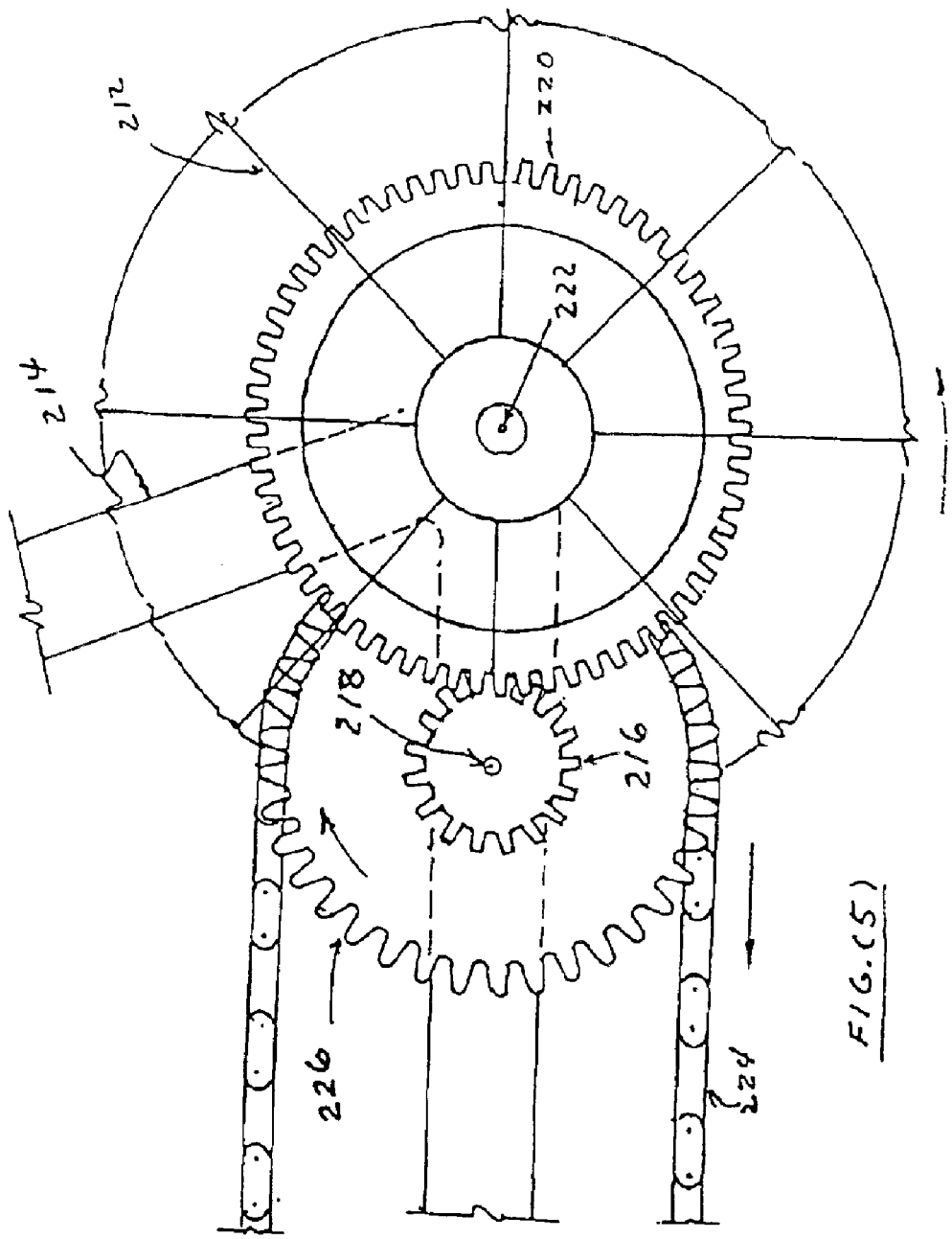

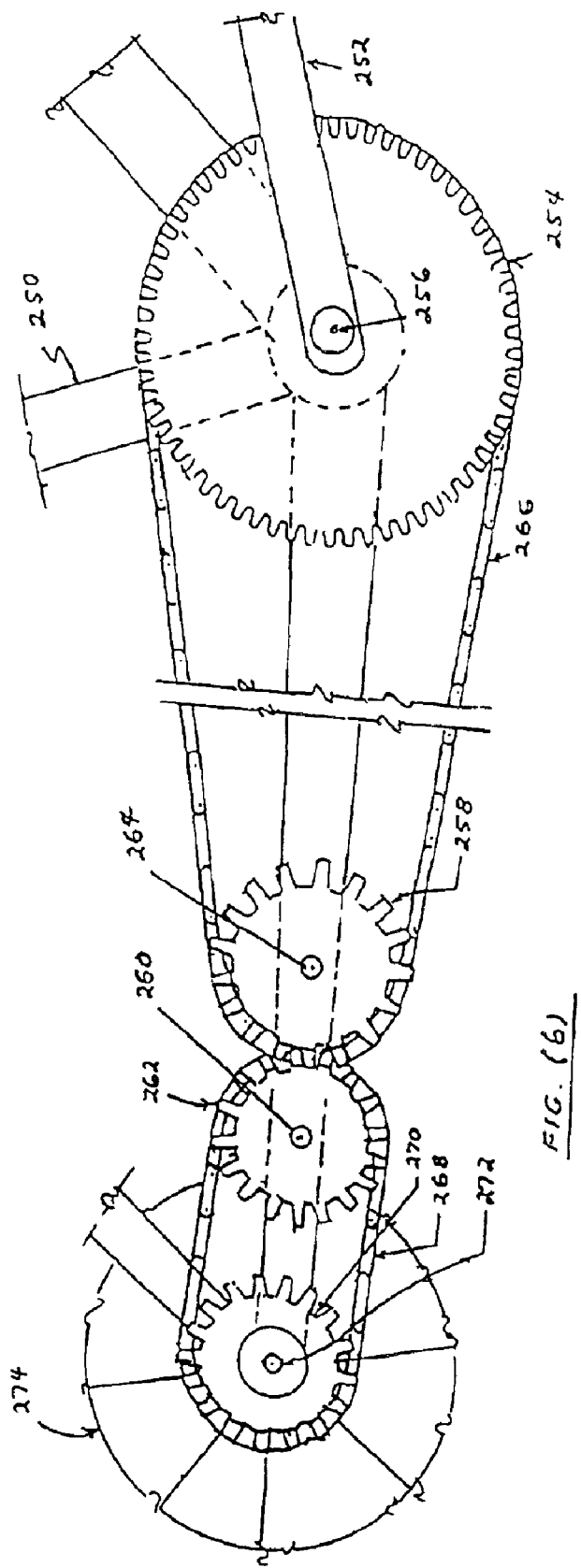
FIG. (6)

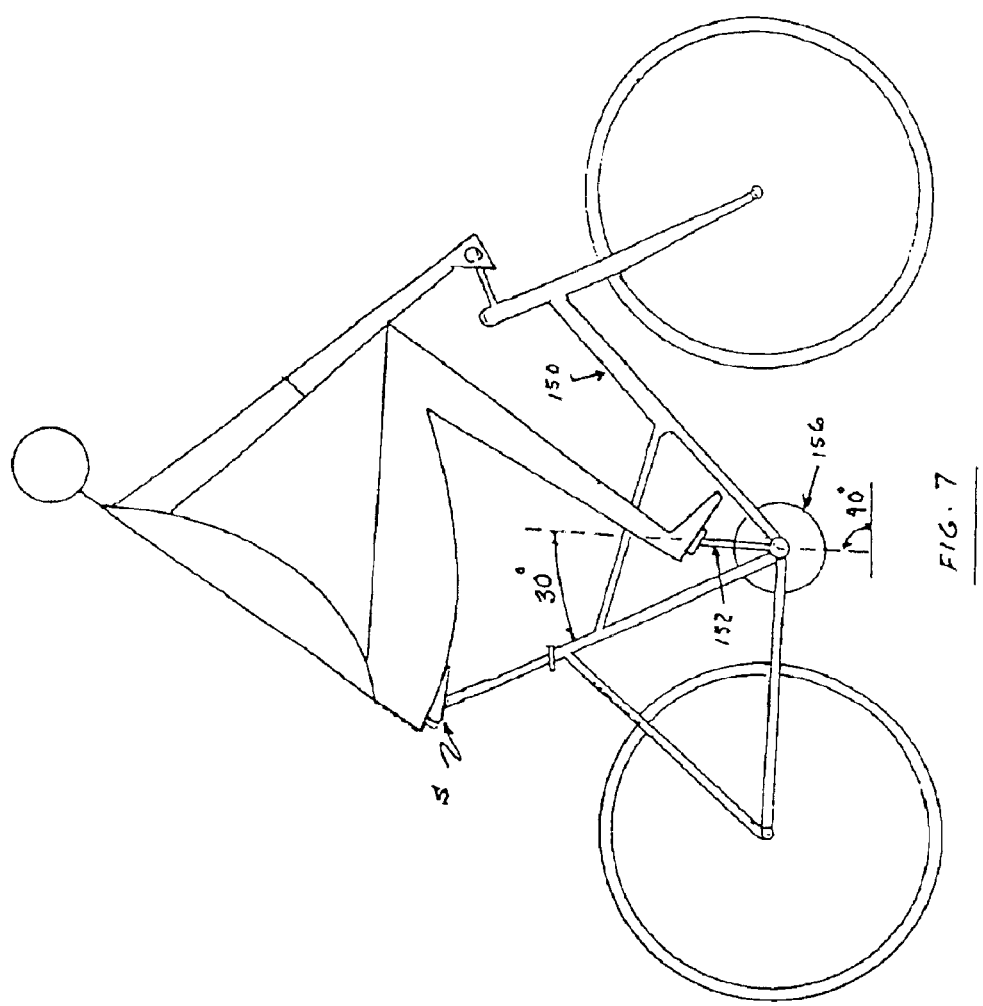

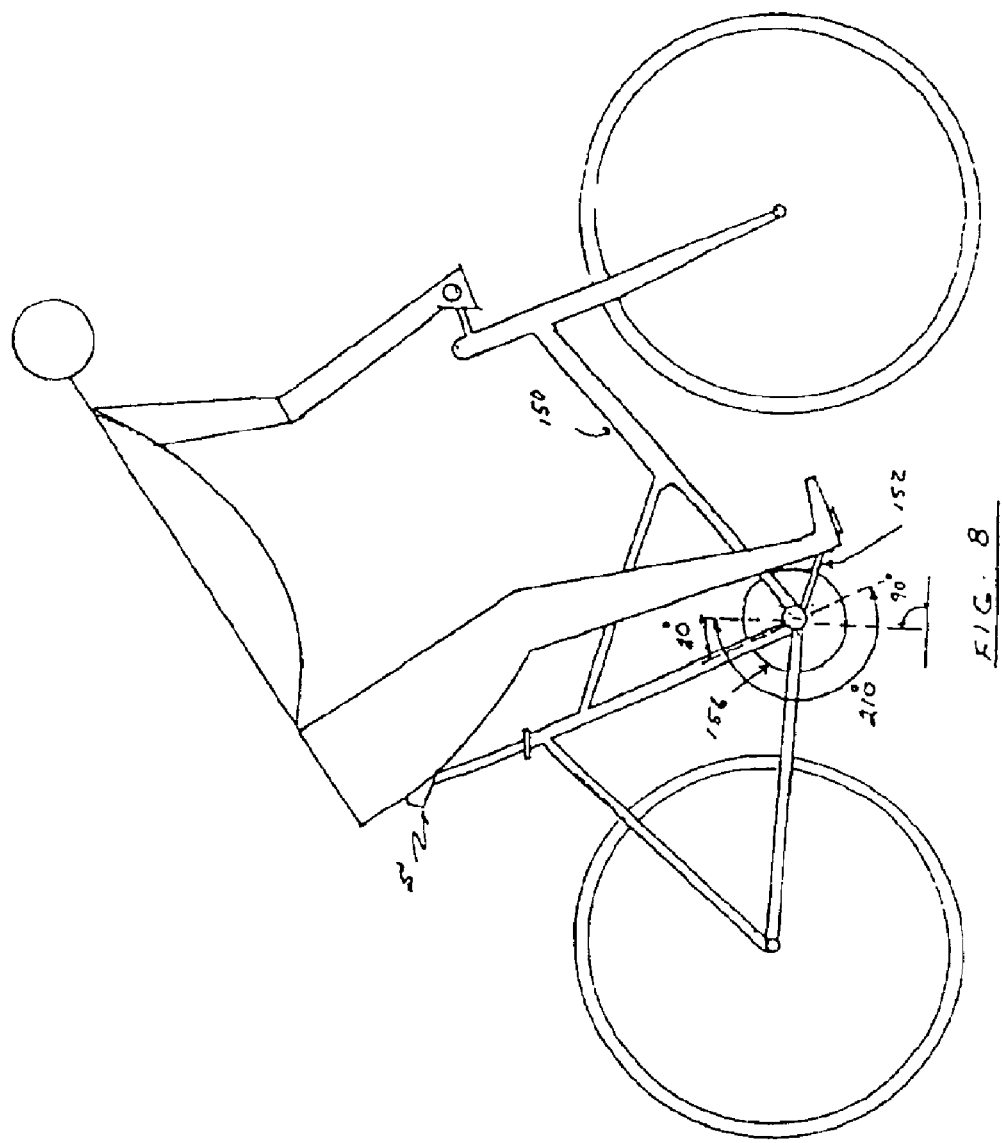

MECHANISM FOR DRIVING BICYCLES

CROSS-REFERENCE TO RELATED APPLICATIONS

This application is a continuation of application Ser. No. 09/986,832 filed on Nov. 13, 2001 now U.S. Pat. No. 6,817,621, which claims the benefit of Provisional Application No. 60/253,093 filed on Nov. 28, 2000.

BACKGROUND OF THE INVENTION

This invention relates to a means for increased efficiency in peddling bicycles. Depending on the position of a cyclist's foot, different fractions of the force exercised are conveyed to automation. It is generally accepted that peddling is least efficient at either the up-stroke or the down-stroke positions. This is due to the fact that the human leg's ability to push downward is higher than its ability to apply a force in a horizontal direction. The up-stroke and the down-stroke positions of peddling are commonly referred to as dead spots. Stop and start cranking at the dead spots will result in lower speed capability due to interruption and discontinuity.

Previous efforts to solve this inefficiency include a design by Jaimes under U.S. Pat. No. 5,911,792, issued Jun. 15, 1999 that presents an orifice located at the middle part of the cranks vertex to resolve the problem; by Nagano, U.S. Pat. No. 5,257,562, issued November 1993, disclosing a crank bar assembly wherein the position of the connection of the pedals to the crank bars can be shifted to-and-fro to reduce inefficiency.

BRIEF DESCRIPTION OF THE DRAWINGS

Six drawings presented show side elevational views of different drive trains for connecting the gears driven by the pedals and those driving the driven wheels, using a chain or a belt. Also two additional drawings are presented illustrating the increased arc through which the pedals may be driven when driven rearwardly.

FIG. 1 shows a design in which a closed loop drive chain 168 is meshed with and drivingly connects a pedal or drive wheel gear 156 with an auxiliary gear 158, each journalled from a bicycle frame 150 and with the chain 168 also meshed with a driven wheel gear 162 journalled from the frame 150, the drive wheel gear 156 being driven in a direction opposite to the direction of rotation of the driven wheel gear 162 by a journalled pedal crank assembly 152.

FIG. 2 shows a design in which a closed loop drive chain 126 is meshed with a driven wheel gear 122 and with an auxiliary gear wheel 118 journalled from a bicycle frame 110 and with a journalled drive or pedal gear wheel 116 also meshed with chain 126, the drive gear wheel 116 and drive wheel 122 rotating in opposite directions.

FIG. 3 shows a design with a closed loop drive chain 58 meshed with a journalled drive or pedal wheel gear 56 and an oppositely rotating, journalled driven wheel gear 60, the two reaches of the chain 58 being crossed.

FIG. 4 shows a design using an auxiliary gear 16 journalled from a bicycle frame 10 and meshed with a drive or pedal gear 20 also journalled from frame 10. A drive gear 22 is fixed to the gear 16 and rotates therewith. A drive chain 24 orbits in a direction opposite to the direction of rotation of the pedal gear 20 and orbits and drives an associated driven wheel (not shown) similar to driven wheel 122.

FIG. 5 shows a design using a driven wheel gear 220 meshed with an auxiliary gear 216 journalled from a bicycle frame 214 and including a second auxiliary gear 226 fastened to auxiliary gear 216. A closed loop drive chain 224 is trained about gear 226 and drives an associated driven wheel 212.

FIG. 6 shows a design in which two auxiliary gears 258 and 262 are journalled from a bicycle frame 250 and meshed together for opposite rotation. Also shown are two closed loop chains 266 and 268. The chain 266 is meshed with auxiliary gear 258 and a drive or pedal wheel gear 254 and the chain 268 is meshed with auxiliary gear 262 and driven wheel gear 270 to rotate driven wheel gear 270 in a direction opposite to the direction of rotation of the pedal or drive wheel gear 254.

FIG. 7 illustrates the uppermost or down-stroke position of the peddling foot; and FIG. 8 illustrates a position of the peddling foot slightly past the lowermost position of the peddling foot when peddling in a counter-clockwise direction.

SUMMARY OF THE INVENTION

The purpose of the invention claimed herein is to minimize the negative influence of dead spots in cycling action.

When using a conventional bicycle and the peddling foot is at the beginning of the down-stroke position (FIG. 7), the thigh portion of the leg is generally at a horizontal position while the calf portion of the leg is inclined backward in a generally 45° direction. At this cramped leg position, the leg's ability to apply a force in the forward direction is severely hampered. However, effective rearward application of the force in a general 45° rearward direction is efficient and productive. Similarly, when using a conventional bicycle and the peddling foot is at the beginning of the up-stroke position, the leg's ability to exert a force in the rearward direction past bottom dead center is severely hampered.

However, subject to sufficient upward and rearward displacement of the position of the seat relative to the pedal crank assembly along a line passing through the axis of rotation of the pedal crank assembly and inclined generally 30 degrees relative to the vertical, forward application of force well past this dead spot is productive. Thus, it becomes evident that rearward peddling for forward locomotion will be effective in reducing the negative affects of dead spots, subject to sufficient rearward displacement of positioning of the bicycle seat from a vertical line passing through the axis of the pedal crank assembly. Driving action is interrupted in conventional bicycles when action is switched from one leg to the other since each leg acts through an angle of less than 180°. Overlapping and uninterrupted cycling action is provided by the bicycle disclosed and claimed herein. The bicycle of the instant invention includes means to peddle backward for forward location to eliminate the influence of dead spots in the cycling action. The innovation claimed herein provides numerous improvements compared with other resolutions of the dead spot problem, including:

1. Reduced cost of production;
2. Simplicity of the design with an operation requiring fewer parts;
3. Less maintenance;
4. Lighter weight;
5. East of operation; and
6. Ease of alteration of existing bicycles.

It is noteworthy that a second advantage of the design claimed is that rearward displacement of the bicycle seat will result in a shift of peddling action forward of the hip position. As a result, the need for slim bicycle seats is eliminated and the use of wide and comfortable seats for the overweight and elderly, as well as for prolonged users is made feasible.

The principle objective of this invention is to provide a light-weight bicycle that can be comfortably ridden and driven by the operator thereof.

Another objective of this invention is to provide a bicycle in accordance with the preceding objectives which will conform to conventional forms of manufacture, be of simple construction, and easy to operate, so as to provide a device that will be economically feasible, long lasting, and relatively trouble-free in operation.

These, together with other objectives and advantages that will become subsequently apparent reside in the details of construction and operation as more fully hereinafter described and claimed. References to accompanying drawings form a part thereof, with like numerals referring to like parts throughout.

DETAILED DESCRIPTION OF THE INVENTION

Referring now more specifically to the drawings, FIG. 1 shows a side elevational view of a first form of bicycle contructed in accordance with the present invention. Numeral 150 shows a frame of a bicycle 151 with a drive or pedal wheel gear 156 supported from a pedal crank assembly 152 journalled from the frame 150 at 154. Numeral 162 refers to a rear driven wheel gear journalled from frame 150 at 166 and including a one-way clutch structure (not shown) for driving, in the forward direction, a driven wheel 164 also journalled from frame 150 at 166. An auxiliary wheel 158 is included and journalled from frame 150 at 160. A closed loop chain 168 is meshed with drive or pedal wheel gear 156 and with auxiliary wheel 158. The driven wheel gear 162 is also meshed with chain 168 as shown such that peddling in rearward direction (counter clockwise) derives the bicycle 151 in the forward direction.

Attention is now directed to the second form of the invention. In FIG. 2 a pedal or drive wheel gear 116 is journalled from a bicycle frame 110 at 114 and a driven wheel gear 122 is journalled from frame 110 at 124. Driven wheel gear 122 includes a one-way clutch structure (not shown). An auxiliary wheel 118 is journalled from frame 110 at 120. A closed loop chain 126 is meshed with auxiliary wheel 118 and with driven wheel gear 122. The pedal or drive wheel gear 116 is meshed with chain 126 as shown such that peddling rearward (counter clockwise) drives frame 110 in the forward direction, to the right.

Attention is now directed to the third form of the invention. FIG. 3 shows a side elevational view of a bicycle frame 50 with a drive wheel assembly 70 including a pedal or drive wheel gear 56 and a pedal crank assembly 52 journalled from frame 50 at 54 and with a driven wheel gear assembly 60 (including a one-way clutch structure and a driven wheel gear 66) rotatably attached to frame 50 at 62. A closed loop chain 58 is meshed with the pedal or drive wheel gear 56 in a direction opposite of the direction is meshed with the driven wheel gear 66 such that rotation of the pedal crank assembly 52 in an anti-clockwise direction drives frame 50 in a forward direction (to the right). For best results the gears may either be tilted, or guiding wheels or spacers (not shown) need be provided to keep the chains in different tracts at their junction.

Attention is now directed to the fourth form of the invention. FIG. 4 shows the side elevational view of a bicycle frame 10 with pedal crank assembly 12 and pedal or drive wheel gear 20 fastened together and journalled from frame 10 at 14. Two auxiliary gears 16 and 22 are coupled with each other and journalled from frame 10 at 18 with gear 16 meshed with pedal wheel gear 20. A closed loop chain 24 is meshed with a driven wheel gear (not shown) and with auxiliary gear 22 as shown such that rearward peddling (counter clockwise) drives the frame 10 in a forward direction (to the right). It is readily visible that the two auxiliary gears 16 and 22 could be of the same diameter in which case said two gears can be combined into one gear.

Attention is now directed to the fifth form of the invention. FIG. 5 shows a side elevational view of a bicycle frame 214 with a driven wheel gear 220 journalled from a bicycle frame 214 at 222 and meshed with an auxiliary gear 216 coupled to a second auxiliary gear 226 and journalled from frame 214 at 218. A driven wheel 212 is journalled from the bicycle frame 214 at 222.

A closed loop chain 224 is meshed with auxiliary gear 226 such that peddling rearward (anti-clockwise) on an associated pedal crank assembly (not shown) about which the chain 224 is also meshed drives frame 214 in a forward direction (to the left). It is readily visible that the two auxiliary gears 216 and 226 can be of the same diameter and that the two auxiliary gears 216 and 226 can be combined into one gear.

Attention is now given to the sixth form of the invention. FIG. 6 shows the side elevational view of a bicycle frame 250 with driven wheel 274 and adjoined driven wheel gear 270 journalled from frame 250 at 272 and with a crank assembly 252 and adjoined pedal or drive wheel gear 254 journalled from frame 250 at 256. Included are two intermeshed auxiliary sprocket wheels 258 and 262 journalled from frame 250 at 264 and 260 respectively. Two closed loop chains 266 and 268 are employed. The chain 266 is meshed with the pedal or drive wheel gear 254 and with the sprocket wheel 258. The chain 268 is meshed with the driven wheel gear 270 and the sprocket wheel 262. The sprocket wheels 258 and 262 include meshed gears (not shown) such that the sprocket wheels 258 and 262 rotate in opposite directions. Therefore, peddling backwards (anti-clockwise) drives the frame 250 in a forward direction (to the right).

FIG. (1) is further employed to illustrate attachment of a separate and supplementary assembly 200 to an existing bicycle 151 as a means for connecting said bicycle pedal gear 156 to the driven wheel gear 162. The assembly 200 includes a bracket 169 to be fastened to the bicycle frame at the pivotal axis 166 of the driven wheel 164. Included is a supplementary gear 158 journalled to bracket 169 at 160. Included is also a closed loop drive chain 168 to be meshed with supplementary gear 160 and with the existing bicycle pedal gear 156 while being engaged with the existing bicycle driven wheel gear 162 in such manner that peddling in rearward direction (counter clockwise) drives the bicycle in the forward direction (to the right).

Referring to FIGS. 7 and 8, it will be noted that the seat S is positioned appreciably above the journal axis of the drive or pedal wheel gear 156. Further, the seat S is positioned appreciably rearward of a vertical line passing through the pedal wheel gear axis. The arrangement shown insures that a user of the bicycle is seated in a substantially upright position and yet physically able to "pump" the pedal crank assembly 152 with each leg through an arc substantially greater than 180° (at least 210+°). The active force duration in each cycle depends on the bicycle and the physical measurements of the rider. For the seat position at angles of 30° rearward of the line of gravity (FIGS. 7 and 8) the peddling action begins shortly before the down stroke position and continues about 30° beyond the lower pedal position (FIG. 8). The result is an active force capability of about 210+° per cycle.

It is now pointed out that the bicycle of the instant invention is designed to be ridden in a substantially upright position and with the seat positioned appreciably above and to the rear of the axis of rotation of the pedal crank or crank bar assembly 152. This not only keeps the head of the rider at a high elevation for safety reasons, but also increases the effectiveness of the reversing pedal drive train. Further, a substantially conventional bicycle frame may be modified in a relatively easy manner to be in accordance with the present invention.

It is believed evident that, as an alternative means, either chain may be replaced by a drive belt. Further, it may be readily seen from the drawings that the drive mechanisms of the bicycles shown are very reliable and require very little maintenance. Further, these drive mechanisms are relatively free of operating resistance and may be constructed of relatively light-weight materials. Therefore, the bicycles claimed may be economically produced and are operable in a relatively effortless manner.

The foregoing is considered as illustrative only of the principles of the invention. Further, since numerous modifications and combinations of different designs and changes can readily occur to those skilled in the art, it is not desired to limit the invention to the exact construction and operation shown and described; and accordingly, all suitable modifications and equivalents that may be resorted to, should be considered as falling within the scope of the invention.

What is claimed is:

1. A vehicle for pedal propulsion by a passenger, said vehicle comprising:
   a frame;
   a pedal crank assembly journalled from said frame about a transverse axis, said pedal crank assembly including a pedal wheel gear;
   a driven wheel journalled from said frame and including at least one driven wheel gear;
   first and second auxiliary wheel gears journalled from said frame, said first and second auxiliary wheel gears being meshed with each other for opposite rotation;
   a first drive chain meshed with said first auxiliary wheel gear and with said pedal wheel gear; and
   a second drive chain meshed with said driven wheel gear and with said second auxiliary wheel gear, wherein the rotation of said driven wheel gear is opposite of the rotation of said pedal wheel gear.

2. The vehicle in claim 1 wherein at least one of said first and second auxiliary wheel gears are positioned between said pedal wheel gear and said driven wheel gear.

3. The vehicle in claim 1, further comprising:
   a seat mounted from said frame appreciably above and rearward of the axis of rotation of said pedal crank assembly such that a person seated on said seat in a substantially upright position may operatively engage and drive said pedal crank assembly with his or her feet.

4. The vehicle in claim 1 wherein said at least one driven wheel gear is equipped with a one-way clutch.

5. The vehicle in claim 1 wherein said frame is a bicycle frame.

6. A propulsion system for a vehicle, the vehicle including a frame and a driven wheel journalled from the frame, the system comprising:
   a pedal crank assembly journalled from the frame about a transverse axis, said pedal crank assembly including a pedal wheel gear;
   at least one driven wheel gear coupled with the driven wheel;
   first and second auxiliary wheel gears journalled from the frame, said first and second auxiliary wheel gears being meshed with each other for opposite rotation;
   a first drive chain meshed with said first auxiliary wheel gear and with said pedal wheel gear; and
   a second drive chain meshed with said driven wheel gear and with said second auxiliary wheel gear, wherein the rotation of said driven wheel gear is opposite of the rotation of said pedal wheel gear.

7. The system in claim 6 wherein at least one of said first and second auxiliary wheel gears are positioned between said pedal wheel gear and said driven wheel gear.

8. The system in claim 6, further comprising:
   a seat mounted from the frame appreciably above and rearward of the axis of rotation of said pedal crank assembly such that a person seated on said seat in a substantially upright position may operatively engage and drive said pedal crank assembly with his or her feet.

9. The system in claim 6 wherein said at least one driven wheel gear is equipped with a one-way clutch.

10. The system in claim 6 wherein the frame is a bicycle frame.

11. A propulsion system for a vehicle, the vehicle including a frame and a driven wheel journalled from the frame, the system comprising:
    a pedal crank assembly journalled from the frame about a transverse axis, said pedal crank assembly including a pedal wheel gear;
    at least one driven wheel gear coupled with the driven wheel;
    first and second auxiliary wheel gears journalled from the frame;
    means for meshing said first and second auxiliary wheel gears with each other so that said first and second auxiliary wheel gears rotate opposite to one another;
    means for meshing said first auxiliary wheel gear with said pedal wheel gear; and
    means for meshing said driven wheel gear with said second auxiliary wheel gear, wherein the rotation of said driven wheel gear is opposite of the rotation of said pedal wheel gear.

12. The system in claim 11 wherein at least one of said first and second auxiliary wheel gears are positioned between said pedal wheel gear and said driven wheel gear.

13. The system in claim 11, further comprising:
    a seat mounted from the frame appreciably above and rearward of the axis of rotation of said pedal crank assembly such that a person seated on said seat in a substantially upright position may operatively engage and drive said pedal crank assembly with his or her feet.

14. The system in claim 11 wherein said at least one driven wheel gear is equipped with a one-way clutch.

15. The system in claim 11 wherein the frame is a bicycle frame.

* * * * *